Figure 1:
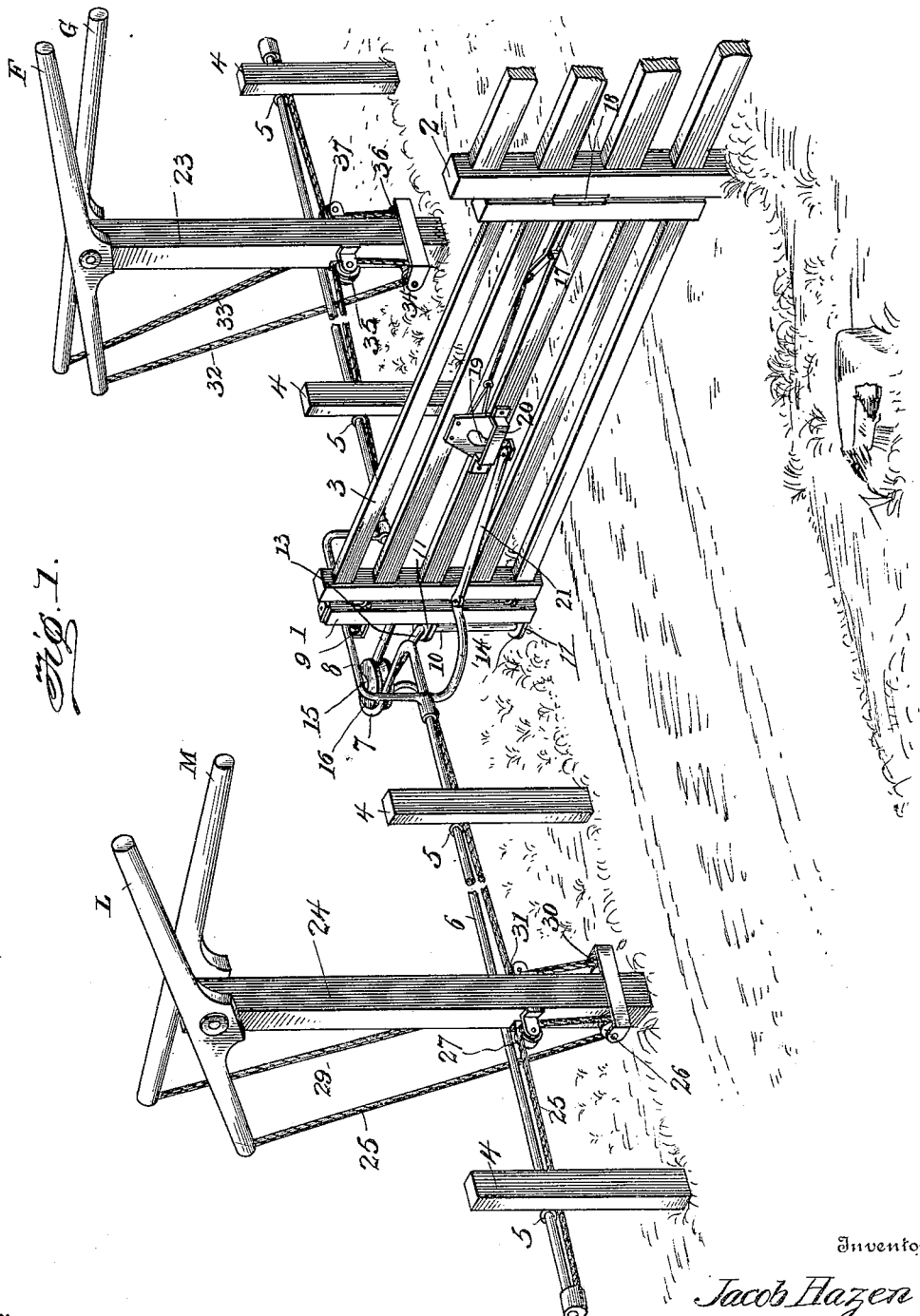

No. 712,675. Patented Nov. 4, 1902.
J. HAZEN.
GATE.
(Application filed June 12, 1902.)
(No Model.) 2 Sheets—Sheet 1.

Witnesses
Fenton S. Belt.
J. A. Willson

Inventor
Jacob Hazen
By H. B. Willson & Co.
Attorneys

No. 712,675. Patented Nov. 4, 1902.
J. HAZEN.
GATE.
(Application filed June 12, 1902.)
(No Model.) 2 Sheets—Sheet 2.
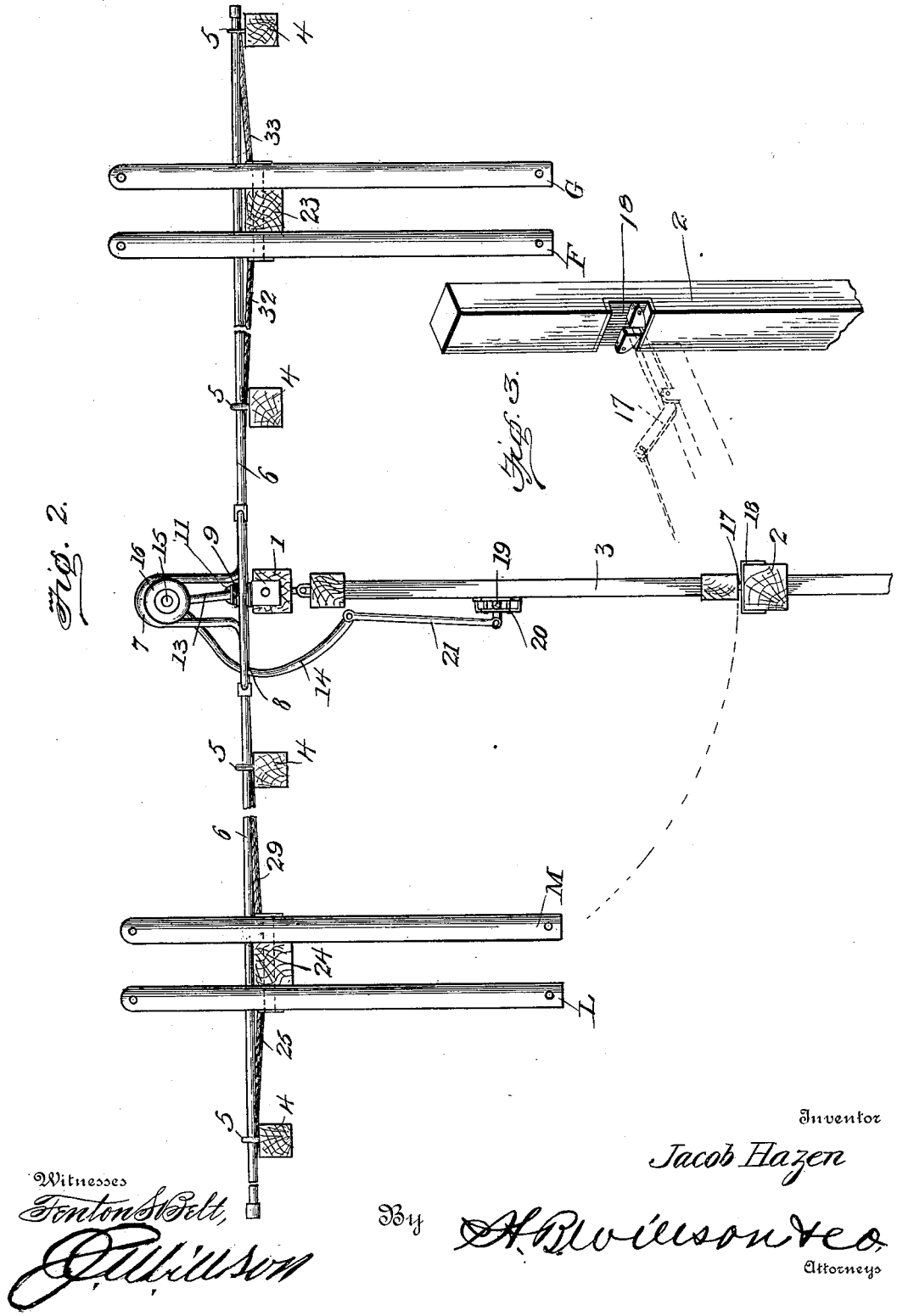
Witnesses
Fenton S. Belt,
J. A. Wilson
Inventor
Jacob Hazen
By H. B. Willson & Co.
Attorneys

UNITED STATES PATENT OFFICE.

JACOB HAZEN, OF WEST INDEPENDENCE, OHIO.

GATE.

SPECIFICATION forming part of Letters Patent No. 712,675, dated November 4, 1902.

Application filed June 12, 1902. Serial No. 111,311. (No model.)

*To all whom it may concern:*

Be it known that I, JACOB HAZEN, a citizen of the United States, residing at West Independence, in the county of Hancock and State of Ohio, have invented certain new and useful Improvements in Gates; and I do declare the following to be a full, clear, and exact description of the invention, such as will enable others skilled in the art to which it appertains to make and use the same.

The invention relates to gates which may be easily operated by pedestrians or persons in carriages or upon horseback.

The object of the invention is to provide a gate which shall be simple of construction, durable in use, comparatively inexpensive of production, and efficient in action.

With this and other objects in view the invention consists of certain novel features of construction, combination, and arrangement of parts, which will be hereinafter more fully described, and particularly pointed out in the appended claims.

In the accompanying drawings, Figure 1 is a perspective view of the gate, and Fig. 2 is a top plan view of the same. Fig. 3 is a detail view of the latch-post, showing the retaining-pawls and the pivoted latch.

Referring to the drawings, 1 denotes the hinge-post, 2 the latch-post, and 3 the gate, hinged to the hinge-post to swing to the right or to the left.

4 denotes a series of posts arranged in line and provided with supporting-brackets 5 in the form of screw-eyes, in which is mounted to slide a rod 6, having a transversely-disposed bail 7 and a vertically-disposed bail 8, the latter of which is adapted to engage a pulley 9, secured to the hinge-post, and is designed to support the bail 7 in a horizontal plane.

10 denotes a vertical shaft journaled in bearings 11, secured to the rear side of the post, and provided at its upper end with an irregular V-shaped crank-arm consisting of the members 13 and 14, at the intersection of which is a vertical pivot 15, which supports a grooved roller 16.

17 denotes a pivoted latch adapted to engage pawls pivoted in a latch-plate 18 on the latch-post and connected to a crank 19, pivoted in a bracket 20, secured to the side of the gate. This crank-arm 19 is connected to the member 14 of the crank-arm by a link 21.

It is evident that when the sliding rod is moved in one direction the gate will be opened and when moved in the opposite direction the gate will be closed. This is accomplished by the transverse bail on the rod engaging the grooved roller and swinging the crank-arm, which causes the arm to be moved inwardly or outwardly, as the case may be, and this arm being connected to the pivoted latch raises said latch from engagement with the pawls and swings the gate either into open or closed position. When the gate closes, the latch will be allowed to drop by gravity, and when down will be in a position to strike beneath the pivoted end of one of the pawls and raise the same, so as to pass into the keeper-plate until stopped by the other pawl, and when this point is reached the first pawl will drop behind the latch and lock the same against movement in either direction.

Any suitable means may be provided for reciprocating the sliding arm 19, but those shown are preferred, and consist of operating levers F G and L M, pivoted to the upper ends of posts, the levers F G being pivoted to the upper end of post 23 and the levers L M being pivoted to the upper end of post 24. The lever L has a cord or rope 25, which passes down about a pulley 26, bracketed to the pots 24, and up about a pulley 27, also bracketed to said post 24, and has its free end attached to the left-hand end of the sliding rod. The lever M has a rope or cord 29 secured to its end, which passes down and about a pulley 30, bracketed to the post 24, up and about a pulley 31, also bracketed to said post, and has its free end attached to the sliding rod near its transverse bail. The levers F and G are provided, respectively, with ropes 32 and 33, which engage pulleys 34, 35, 36, and 37, arranged, connected, and operated in the manner similar to the ropes 25 and 29.

The operation of the invention is as follows: Assuming the gate to be closed and it be desired to open the same by a person adjacent to the levers F and G, the lever G is grasped and its free end pressed downwardly, thus sliding the rod to the left and swinging the member 14 of the crank to the right. This movement of the member 14 will raise the latch from engagement with the pawls and swing the gate to the right. After passing through the gateway should it be desired to close the gate the lever L is depressed, and this movement will slide the rod to the right and draw the gate closed and allow its latch to engage the pawls. Should a person approaching in the opposite direction now desire to open the gate, the lever M is depressed and the gate swung open, and after passing through the gateway the lever F is grasped and pressed, thus closing the gate.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with a hinged gate, of a sliding rod having a bail, a pivoted crank-arm operated by the bail, a roller supported thereby, and a connection between the gate and the crank-arm, whereby on the reciprocation of the rod, the gate will be opened and closed, substantially as set forth.

2. The combination with a hinged gate, of a sliding rod provided with a horizontally-disposed bail and with a vertically-disposed bail, means for supporting the latter bail in a vertical position and thus retaining the horizontal bail in its horizontal position, a pivoted crank, a roller pivoted to said crank and engaging the horizontal bail, and a link connecting the gate to the crank, whereby upon reciprocation of the rod, the gate will be opened and closed, substantially as set forth.

3. The combination with a hinged gate, of a sliding rod provided with a horizontally-disposed bail and with a vertically-disposed bail, means for supporting the latter bail in a vertical position and thus retaining the horizontal bail in its horizontal position, a pivoted crank, a roller pivoted to said crank and engaging the horizontal bail, a link connecting the gate to the crank, and operating levers and ropes connected to said sliding rod for reciprocating it, substantially as set forth.

In testimony whereof I have hereunto set my hand in presence of two subscribing witnesses.

JACOB HAZEN.

Witnesses:
D. P. GIBSON,
L. W. GIBSON.